United States Patent
McGill

Patent Number: 6,133,869
Date of Patent: Oct. 17, 2000

[54] PASSIVE TECHNIQUE FOR THE REMOTE DETECTION OF BURIED OBJECTS

[75] Inventor: Robert E. McGill, Dix Hills, N.Y.

[73] Assignee: Northrop Grumman Corporation, Los Angeles, Calif.

[21] Appl. No.: 09/216,404

[22] Filed: Dec. 18, 1998

[51] Int. Cl.[7] .................................................. G01S 3/02
[52] U.S. Cl. .......................................... 342/351; 342/459
[58] Field of Search ...................................... 342/459, 351

[56] References Cited

U.S. PATENT DOCUMENTS

| | | | |
|---|---|---|---|
| 3,903,520 | 9/1975 | Shostak ................................ | 343/5 PD |
| 4,728,897 | 3/1988 | Gunton .................................... | 324/329 |
| 4,843,597 | 6/1989 | Gjessing et al. .......................... | 367/15 |
| 4,905,008 | 2/1990 | Kawano et al. .......................... | 342/22 |
| 5,248,975 | 9/1993 | Schutz ...................................... | 342/21 |
| 5,325,095 | 6/1994 | Vadnais et al. ........................... | 342/22 |
| 5,339,080 | 8/1994 | Steinway et al. ......................... | 342/22 |
| 5,357,253 | 10/1994 | Van Etten et al. ........................ | 342/22 |
| 5,446,461 | 8/1995 | Frazier ...................................... | 342/22 |
| 5,499,029 | 3/1996 | Bashforth et al. ........................ | 342/22 |
| 5,673,050 | 9/1997 | Moussally et al. ....................... | 342/22 |
| 5,886,664 | 9/1999 | Yujiri et al. .............................. | 342/351 |

*Primary Examiner*—Thomas H. Tarcza
*Assistant Examiner*—Fred H. Mull
*Attorney, Agent, or Firm*—Terry J. Anderson; Karl J. Hoch, Jr.

[57] ABSTRACT

A technique is provided for passively detecting the presence and location of an underground object. A plurality of individual antennas positioned in a linear array are directed to receive fields of view which are mutually parallel in azimuth. The linear array is then focused at a plurality of different angles in azimuth for passively acquiring low level random noise signals in the RF spectrum which are emitted by the underground object and by the intervening media. A radiometric receiver receives the noise signals acquired by each of the antennas as a separate channel, digitizes them and forwards them to a signal processor which performs a number of operations including:

- a mathematical integration for each separate channel received by the radiometric receivers;
- the generation from each of the integrated channels of a plurality of simultaneous digitally synthesized electromagnetic fields of view;
- directing the plurality of electromagnetic fields of view at a plurality of different spatial angles;
- performing an autocorrelation operation on each of the integrated channel responses;
- computing an inverse Fourier transform on the result of the autocorrelation operation on each of the integrated channel responses; and
- generating a spectrograph therefrom presenting power as a function of frequency.

From all of the foregoing, the system of the invention is able to determine the location and depth of the underground object.

10 Claims, 4 Drawing Sheets

PASSIVE TECHNIQUE FOR THE REMOTE DETECTION OF BURIED OBJECTS

BACKGROUND OF THE INVENTION

1. Field of the Invention

The present invention relates generally to the remote detection of buried objects and. more specifically, to a technique for passively detecting the presence and location of an underground object. The invention includes a simultaneous multibeam architecture which provides high sensitivity, high resolution, wide area coverage and the frequency domain processing of passive broadband radiometric signals attributable to subterranean objects. A multi-dimensional target characterization vector array is computed and utilized to spatially locate the target object in terms of its surface location and estimated depth.

2. Description of the Prior Art

The following U.S. patents are generally indicative of the prior art at the time the invention was conceived and disclose various systems for remotely detecting buried objects using Fast Fourier Transforms:

| U.S. Pat. No. | Inventor(s) | Issued |
| --- | --- | --- |
| 5,499,029 | Bashforth et al. | 03/12/96 |
| 5,446,461 | Frazier | 08/29/95 |
| 5,357,253 | Van Etten et al. | 10/18/94 |
| 5,339,080 | Steinway et al. | 08/16/94 |
| 5,325,095 | Vadnais et al. | 06/28/94 |
| 4,843,597 | Gjessing et al. | 06/27/89 |

The following references disclose various ground penetrating radar systems.

| U.S. Pat. No. | Inventor(s) | Issued |
| --- | --- | --- |
| 5,673,050 | Moussally et al. | 09/30/97 |
| 5,248,975 | Schatz | 09/28/93 |
| 4,905,008 | Kawano et al. | 02/27/90 |
| 4,728,897 | Gunton | 03/01/88 |
| 3,903,520 | Shostak | 09/02/75 |

All of the cited references cited pertain to conventional radar systems. Specifically, they all utilize a radar transmitter as a source of illuminating energy. This artificially generated energy is directed towards the target and is eventually reflected by the buried object(s) under study.

It was with knowledge of the foregoing state of the technology that the present invention has been conceived and is now reduced to practice.

SUMMARY OF THE INVENTION

The present invention relates to a technique for passively detecting the presence and location of an underground, or buried, object. A plurality of individual antennas positioned in a linear array are directed to receive fields of view which are mutually parallel in azimuth. The linear array is then focused at a plurality of different angles in azimuth for passively acquiring low level random noise signals in the RF spectrum which are emitted by the underground object and by the surrounding terrain. A radiometric receiver receives the noise signals acquired by each of the antennas as a separate channel, digitizes them and forwards them to a signal processor which performs a number of operations including:

a mathematical integration for each separate channel received by the radiometric receivers;

the generation from each of the integrated channels of a plurality of simultaneous digitally synthesized electromagnetic fields of view;

directing the plurality of electromagnetic fields of view at a plurality of different spatial angles;

performing an autocorrelation operation on each of the integrated channel responses;

computing an inverse Fourier transform on the result of the autocorrelation operation on each of the integrated channel responses; and generating a spectrograph therefrom presenting power as a function of frequency.

From all of the foregoing, the system of the invention is able to determine the location and depth of the underground object.

The approach presented in this disclosure is structured around the detection and processing of naturally occurring passive broadband radio frequency radiometric signals which originate from buried objects and the intervening media between the object and the surface. These signals, which may be emitted by the object or reflected by the object, or both, are attributable to the physical temperature and emissivity of the materials under study. On an atomic/molecular level, the material particles are agitated due to their thermal energy and radiate as consequence of accelerations and collisions within their own structures. These signals are received and processed by the radio frequency radiometer receiver. This approach has several significant and unique advantages; these include a design simplicity and economy since an external transmitter is not required and also, since it is passive, it is covert. Also unique and of primary importance is the interaction of the radiometric signals from the buried object of interest and the intervening media or overburden material. This stratified layering forms a resonant structure whose power spectrum (energy vs. frequency) characteristics are recognizable in the frequency domain. This allows not only the detection of a buried object but also the capability to estimate its depth. Also considered unique is the technique for generating the power spectra via the inverse Fourier transformation of the autocorrelations of each of the spatially distinct responses from the multibeam antenna architecture.

A primary feature, then, of the present invention is the provision of a novel technique for the remote detection of buried objects.

Another feature of the present invention is the provision of such a novel technique for passively detecting the presence and location of an underground object.

Still another feature of the present invention is the provision of such a novel technique which includes a simultaneous multibeam architecture which provides high sensitivity, high resolution, wide area coverage and the frequency domain processing of passive broadband radiometric signals attributable to subterranean objects.

Yet another feature of the present invention is the provision of such a novel technique according to which a multi-dimensional target characterization vector array is computed and utilized to spatially locate the target object in terms of its surface location and estimated depth.

Still a further feature of the present invention is the provision of such a novel technique which embodies a design simplicity and economy since an external transmitter is not required and which, since it is passive, is covert.

Yet a further feature of the present invention is the provision of such a novel technique which utilizes the interaction of the radiometric signals from the buried object of interest and the overburden material, the stratified layering forming a resonant structure whose power spectrum (energy vs. frequency) characteristics are recognizable in the frequency domain, allowing not only the detection of a buried object but also the capability to estimate its depth.

Still another feature of the present invention is the provision of such a novel technique which calls for generating the power spectra via the inverse Fourier transformation of the autocorrelations of each of the spatially distinct responses from the multibeam antenna architecture.

Still a further feature of the present invention is the provision of such a novel technique which pursues a radically different approach than the prior art, specifically, the processing and recognition of radiometric signatures in the frequency domain.

Still another feature of the present invention is the provision of such a novel technique according to which the power spectrum (power vs. frequency) is utilized to recognize and characterize the buried object(s) of interest, also determining the depth of the object, a feature not available with amplitude radiometric measurement techniques.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

Figure 1:
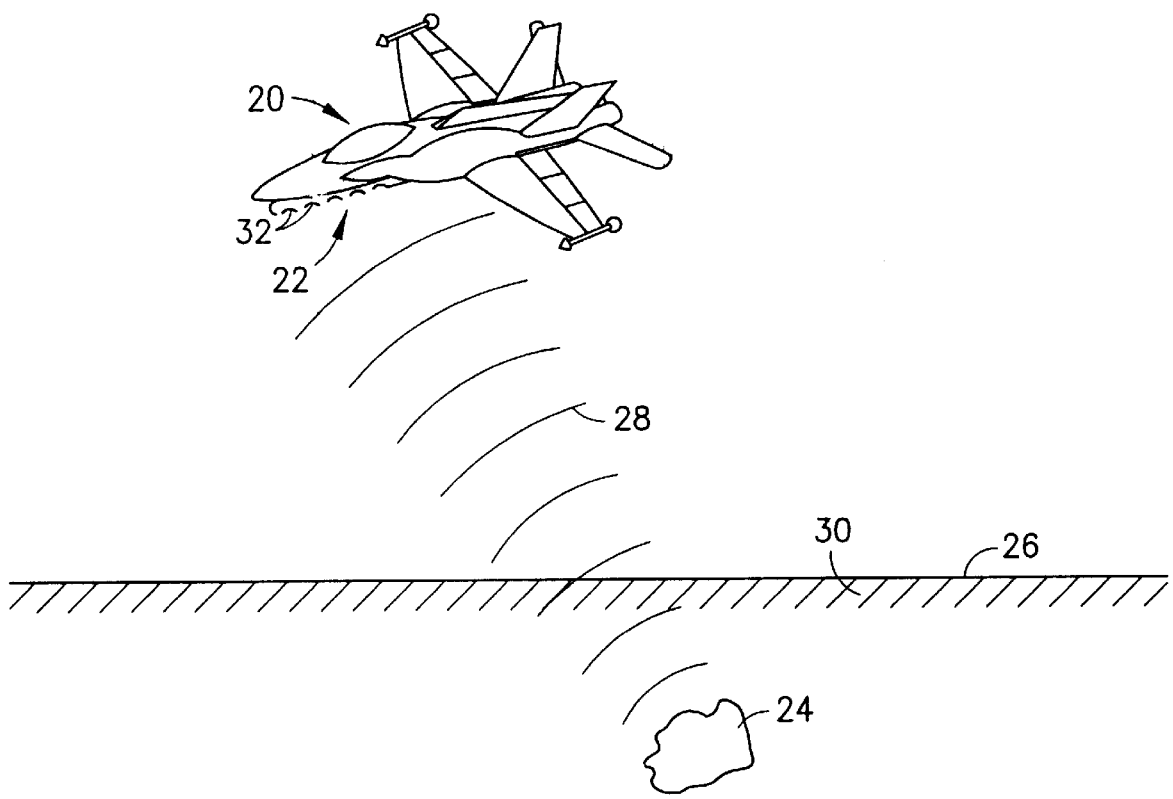
FIG. 1 is a diagrammatic illustration of a detection aircraft equipped with a system embodying the invention overflying the site of a buried object.

Turn now to the drawings and, initially, to FIG. 1 which generally illustrates an aircraft 20 as but one example of a detection platform equipped with a system 22 (FIG. 2) embodying the invention for passively detecting the presence and location of an underground object 24. Detection depths may range from near a surface 26 to several tens of meters beneath the surface depending on system performance, object size, sensor/target range and orientation and the electromagnetic characteristics of the ground. As earlier noted, the approach of this invention is structured around the detection and processing of naturally occurring passive broadband radio frequency radiometric signals 28 which originate from the buried object 24 and from the intervening media 30 between the object and the surface 26. These signals, which may be emitted by the object or reflected by the object, or both, are attributable to the physical temperature and emissivity of the materials under study. On an atomic/molecular level, material particles comprising the buried object are agitated due to their thermal energy and radiate as consequence of accelerations and collisions within their own structures. These signals are received by an antenna 32 and processed by a radio frequency radiometer receiver 34.

This approach has several significant and unique advantages including design simplicity and economy since an external transmitter is not required. Also, since the system 22 is passive, it is covert. Also unique and of primary importance is the interaction of the radiometric signals 28 from the buried object 24 of interest and the intervening media or overburden material 30. This stratified layering forms a resonant structure whose power spectrum (energy vs. frequency) characteristics are recognizable in the frequency domain. This allows not only the detection of a buried object but also the capability to estimate its depth as will be described subsequently. Also considered to be a unique feature of the invention is the technique for generating the power spectra via the inverse Fourier transformation of the autocorrelations of each of the spatially distinct responses from the multibeam antenna architecture.

Specific assertions for this invention's unique features include its simultaneous, multiple field of view architecture which provide high sensitivity, high resolution, wide area coverage, and its frequency domain processing of passive broadband radiometric signals attributable to subterranean objects. A multi-dimensional (frequency and space) target characterization vector array is computed and utilized to spatially locate the target object in terms of its surface location and estimated depth. The key features of this technique are conceptually shown in FIG. 2.

Figure 2:
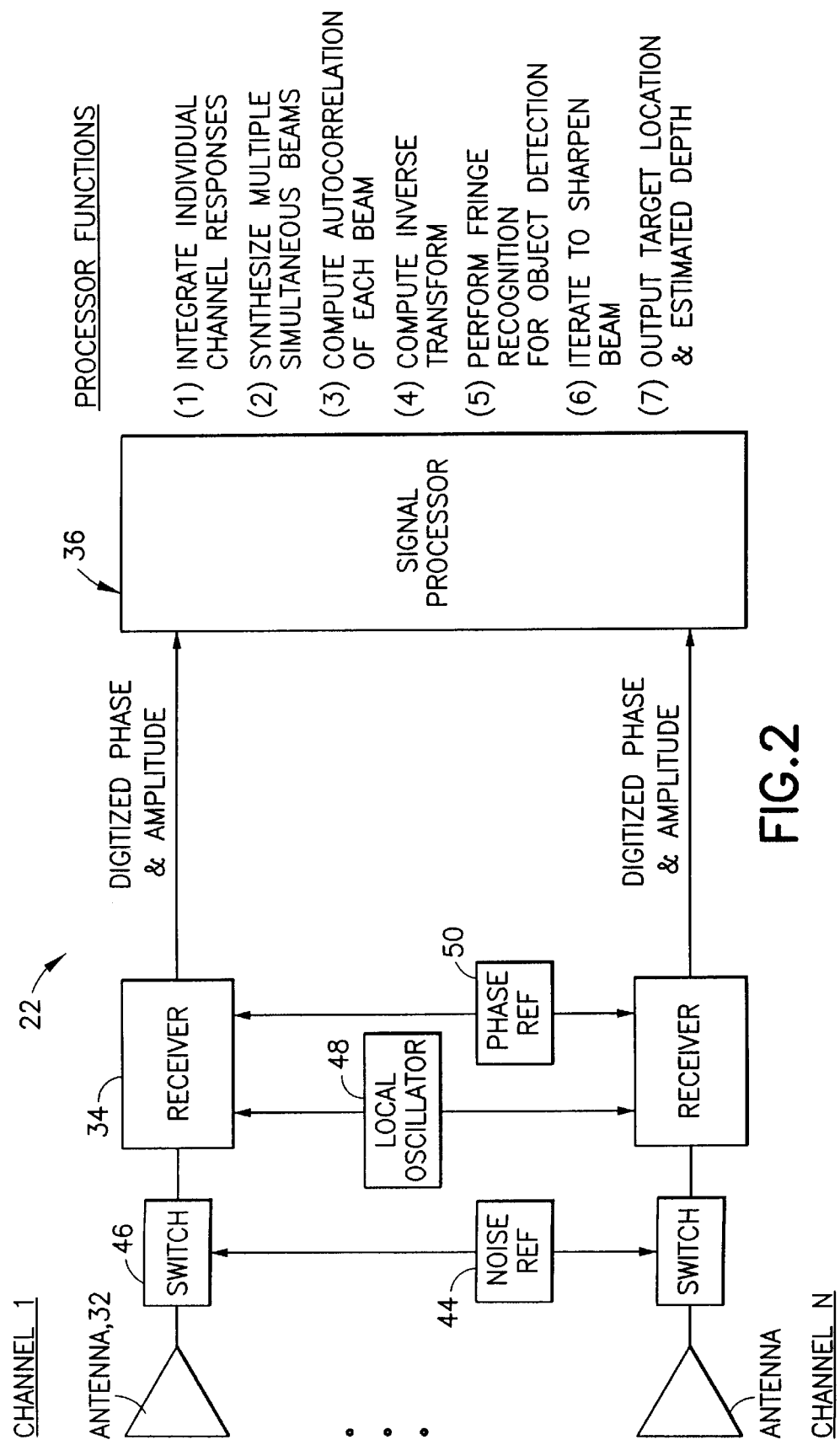
FIG. 2 is a flow diagram depicting the system of the invention.

Thus, referring to both FIGS. 1 and 2, a plurality of individual antennas 32 are suitably mounted on the aircraft 20 in a linear array which is focused at a plurality of different angles in azimuth. These antennas are directed to receive fields of view which are mutually parallel in azimuth and are operable for passively acquiring the low level random noise signals 28 in the RF spectrum which are emitted by the underground object 24 and by the intervening media 30. Associated with each antenna 32 is a radiometric receiver 34, an amplitude measuring device desirably of the superheterodyne type, for receiving the noise signals 28 acquired by each of the antennas as a separate channel and digitizing them. The system 22 can thereby be termed an n-channel system. Broadly, the system 22 is completed with the inclusion of a signal processor 36, a central processor unit (CPU) which is capable of performing a number of functions vital for operation of the invention.

Figure 6:
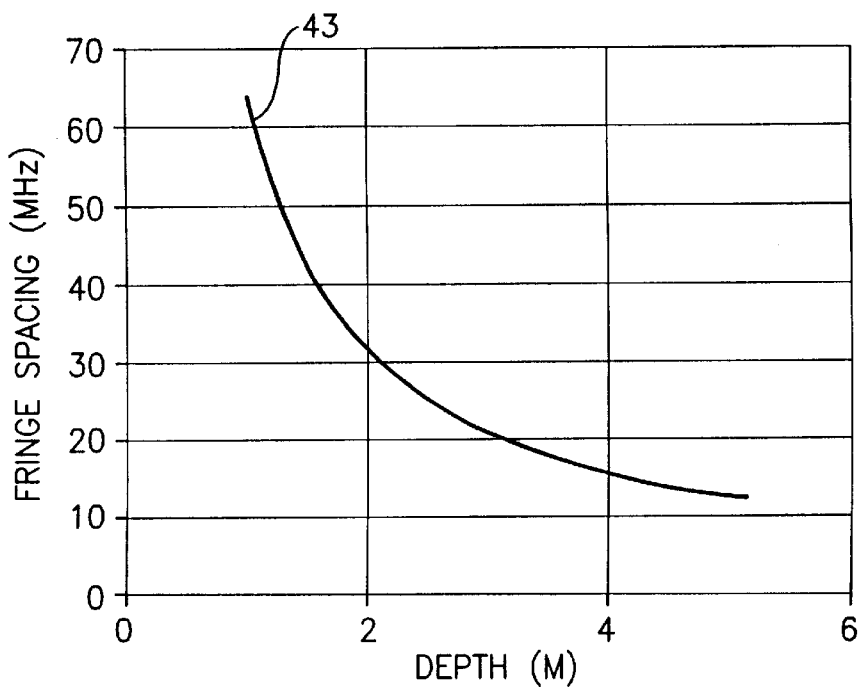
FIG. 6 is a graph presenting a resultant curve relating the depth of a buried object as a function of fringe spacing.
Figure 3:
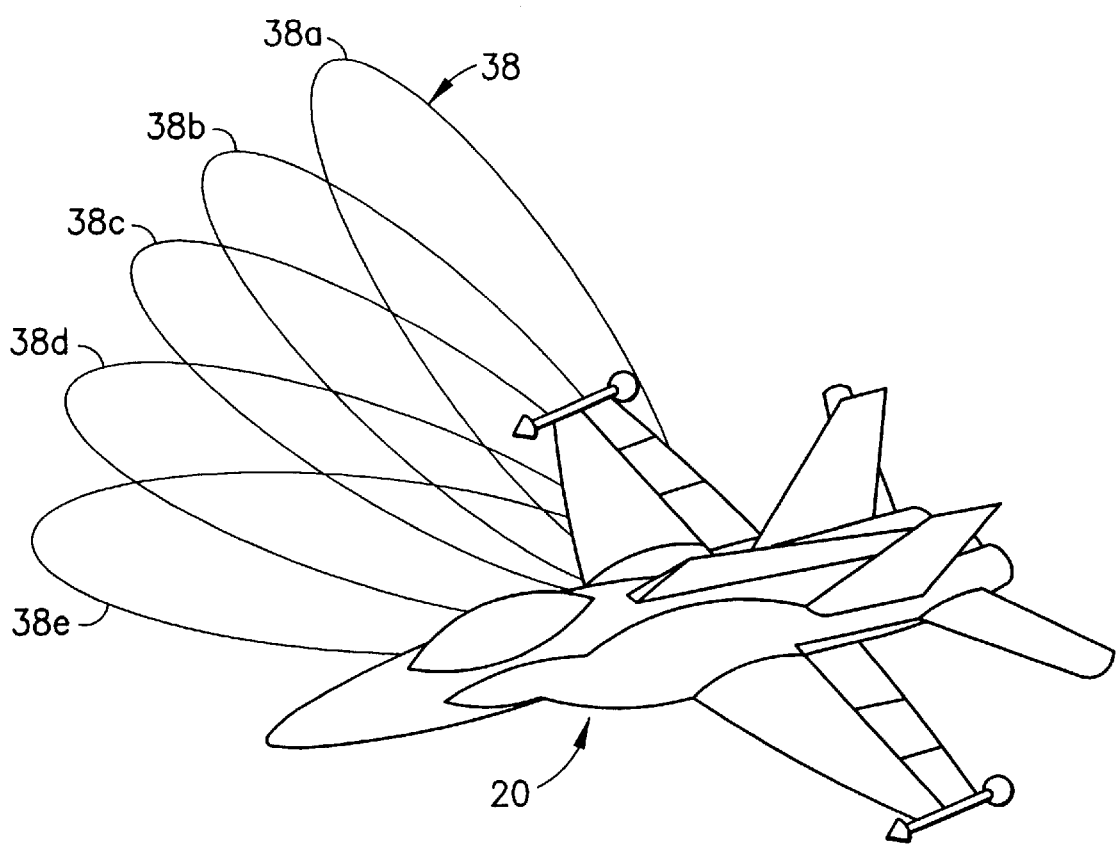
FIG. 3 is a perspective view of an aircraft as a detection platform equipped with the system of the invention and directing a plurality of digitally synthesized fields of view at a plurality of different spatial angles for purposes of the invention.
Figure 4:
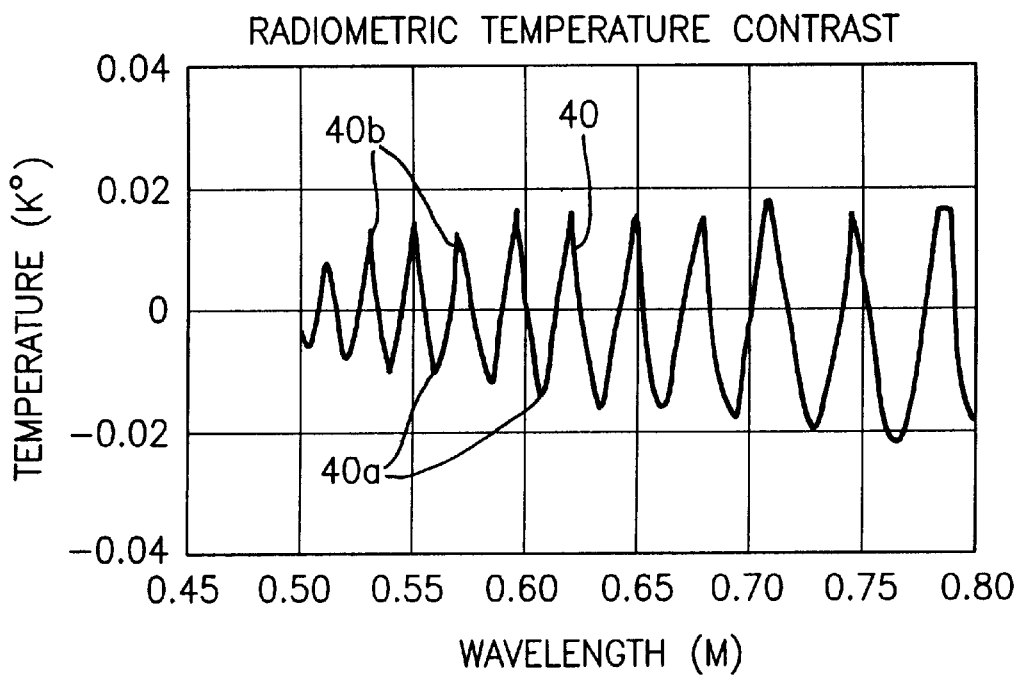
FIG. 4 is a graph presenting temperature (proportional to power) as a function of wavelength proportional to frequency) resulting in a curve referred to as a spectrograph.
Figure 5:
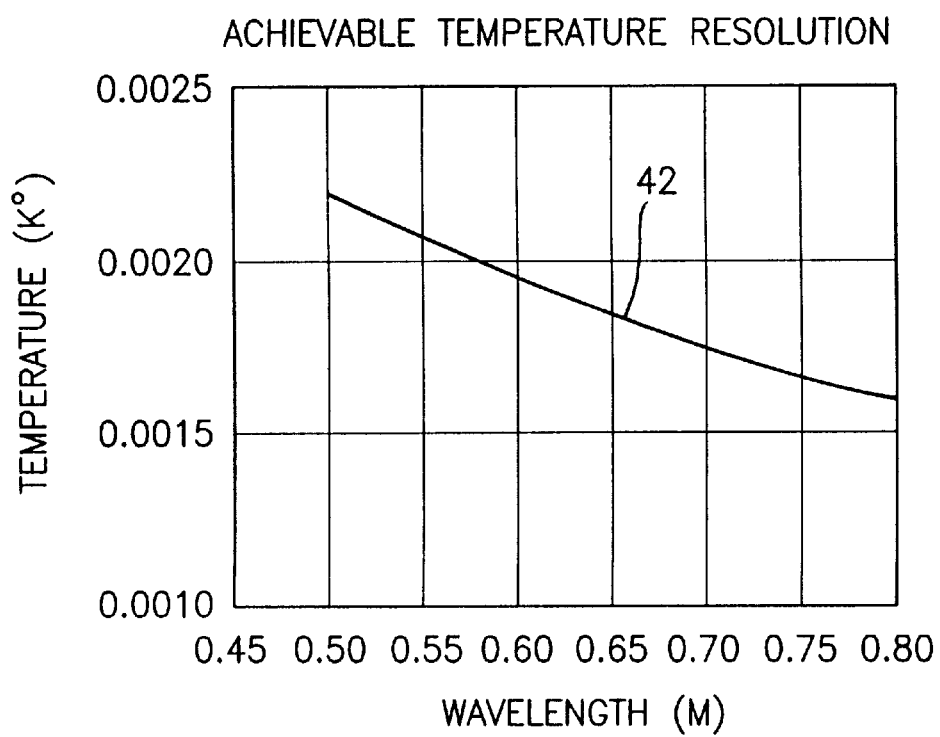
FIG. 5 is a graph presenting temperature (proportional to power) as a function of wavelength (proportional to frequency).resulting in a frequency separation curve which is related to the depth of the buried object.

In a first instance, the signal processor 36 performs a mathematical integration for each separate channel received by each radiometric receiver 34, then generates from each of the integrated channels a plurality of simultaneous digitally synthesized electromagnetic fields of view 38 and directs those electromagnetic fields of view at a plurality of different spatial angles (see FIG. 3) as directed fields of view 38a, 38b, 38c, and so forth. Thereupon, the signal processor 36 performs an autocorrelation operation on each of the integrated channel responses and computes an inverse Fourier transform on the result of the autocorrelation operation on each of the integrated channel responses, then, from that information, generates a spectrograph 40 (see FIG. 4) presenting temperature (proportional to power) as a function of wavelength (proportional to frequency). By measuring the separation between successive adjacent minima 40$a$, or valleys, or between adjacent maxima 40$b$, or peaks, a frequency separation curve 42 (see FIG. 5) is obtained which is related to the depth of the buried object 24. FIG. 6 presents an object depth curve 43 which relates the depth of the buried object 24 to the fringe spacing, that is, to the spacing between adjacent minima 40$a$ or adjacent maxima 40$b$ of the spectrograph 40.

The signal processor 36 also possesses, first, the capability of performing iterations of the autocorrelation operation on each of the integrated channel responses and for computing an inverse Fourier transform on the result of the autocorrelation operation on each of the integrated channel responses; and, further, the capability of calculating the size of the buried object 24 from the information resulting from the outputs obtained from performing the autocorrelation operation.

Returning to FIG. 2, the system 22 also includes a common noise reference 44 for amplitude matching pre-determined noise signals with each of the noise signals acquired by the plurality of antennas 32. Further, a suitable switch 46 is provided in series between each antenna 32 and its associated radiometric receiver 34 for alternatively switching between the common noise reference 44 for amplitude matching pre-determined noise signals with the noise signals acquired by the antennas. This common noise reference may be, for example, a resistor at a predetermined temperature or a semiconductor junction which produces constant amplitude noise. The noise reference 44 serves to provide a means to calibrate the radiometric receivers so as to remove the effect of receiver generated noise and imbalance among the receivers.

Also associated with each radiometric receiver 34 is a local oscillator 48 for providing a common mixing signal, diagrammatically represented by the reference numeral 50, for down conversion. Similarly, a common phase reference signal 50 is provided to each of the radiometric receivers 34 for coherent phase detection. Throughout the operation of the system 22, it is necessary to preserve the phase coherence of each of the radiometric receivers 22. The oscillator 48 may be, for example, a dielectric resonator and serves to produce a locally generated radio frequency signal which provides a reference for heterodyning with the received signal for down conversion to a conveniently handled intermediate frequency.

This technique, then, brings together, in a unique fashion, several diverse technologies. The roots of this technique are based in radio frequency (RF) radiometry. This refers to the passive acquisition and measurement of low level random noise signals in the RF spectrum, which are both emitted and reflected by objects. The origin of this radiated noise is thermally agitated molecular motion within the object of interest, its surroundings and its background. Traditional radiometry measures and records the spatial distribution of the amplitude of this noise energy. This invention pursues a radically different approach, specifically, the processing and recognition of radiometric signatures in the frequency domain. In this approach, the power spectrum (power or temperature vs. frequency or wavelength) is utilized to recognize and characterize the buried object(s) of interest. This technique also determines the depth of the object, a feature not available with amplitude radiometric measurement techniques.

This invention exploits the frequency dispersive character of natural and cultural horizontal stratifications of buried objects and their surroundings and the complex impedance variations of both. Examples include the impedance variations between soil overburdens and buried concrete structures, soil overburdens and subterranean voids or other geological formations. The cascading or stratifying of layers form an interactive structure where the aforementioned signals undergo multiple reflections at these boundaries or impedance discontinuities; these multiple reflections are superposed with a resultant set of characteristic interference fringes. These clearly recognizable maxima and minima, are spread across a portion of the RF spectrum. The spectral separation between these fringes is directly related to the spatial separation between these impedance boundaries. Multiple layers will result in a detailed fine structure in the recovered power spectrum.

The radiometer receiver considered for this application is a mature design. The uniqueness of this invention is the application of many of these devices and the subsequent signal processing. Initial considerations suggest a linear array of eight individual antennas operating in conjunction with eight super-heterodyne radiometer receivers for application in a tactical airborne scenario. Each antenna/receiver pair (or channel) receives, detects and digitizes the low level noise signals being reflected by and/or originating from the region being examined. Each of the channels shares a common noise reference signal for amplitude matching and a common local oscillator and a common phase reference signal for down-conversion and phase detection. The detected signals are integrated during a coherent processing interval whose duration is determined by the dynamics of the host platform. For an airborne application, altitude, ground speed, range and angle to the region of interest determine the available integration time.

The digitized outputs from each of the receiver channels are phase and amplitude weighted and then vector summed in the signal processor to form multiple composite or directive fields of view. These fields of view, focused at different spatial angles provide overlapping coverage of the scene of interest and are simultaneously synthesized in the processor. The combined benefits of a wide area search attributable to the broad angle coverage of a single channel and the improved spatial resolution of a focused field of view from an array of multiple channels is realized. The platform motion provides a transferal of scene information between successive fields of view along the direction of motion. Suitable processing will provide additional sharpening of spatial resolution by assessing the common responses of each adjacent field of view.

Frequency domain processing of the radiometric signals is accomplished by first calculating the autocorrelation function of the synthesized response of each of the composite fields of view. Subsequently, the inverse Fourier transform of each of these autocorrelations is computed to provide the power spectrum of the region under study covered by that specific composite field of view. Detected frequency fringes will denote the presence and the depth of a buried object. In conjunction with pointing (directional) information of each of the synthesized antenna fields of view, the buried object is thus detected and located.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A method of passively detecting the presence and location of an underground object comprising the steps of:
    (a) passively acquiring a plurality of low level random noise signals in the RF spectrum which are emitted and/or reflected by the underground object and by the intervening media;
    (b) conveying each of the plurality of noise signals acquired in step (a) as a separate channel to a radiometric receiver;
    (c) performing a mathematical integration for each separate channel received by the radiometric receiver;
    (d) generating from each of the integrated channels resulting from step (c) a plurality of simultaneous digitally synthesized electromagnetic fields of view;
    (e) directing the plurality of electromagnetic fields of view generated in step (d) at a plurality of different spatial angles;
    (f) performing an autocorrelation operation on each of the integrated channel responses;
    (g) computing an inverse Fourier transform on the result of step (f) and generating a spectrograph therefrom presenting power as a function of frequency; and
    (h) determining the location and depth of the underground object from the information contained in the spectrograph.

2. A method as set forth in claim 1 including the steps of:
    (i) performing iterations of steps (f) and (g); and
    (j) calculating the size of the buried object from the information resulting from the outputs obtained in step (i).

3. A method as set forth in claim 1 including the steps of:
    (i) providing a common noise reference for amplitude matching with the noise signals acquired in step (a); and
    (j) alternatively switching between the noise signals acquired in step (a) and the noise signals acquired in step (i) for calibrating and balancing the receivers.

4. A method as set forth in claim 1 including the steps of:
    (i) providing a common local oscillator signal to each of the radiometric receivers for down conversion; and
    (j) providing a common phase reference signal for coherent phase detection.

5. A method as set forth in claim 1 wherein step (a) includes the steps of
    (i) providing a linear array of individual antennas focused at a plurality of different angles in azimuth.

6. A system for passively detecting the presence and location of an underground object comprising:

a plurality of antennas for passively acquiring low level random noise signals in the RF spectrum which are emitted and/or reflected by the underground object and by the intervening media;

a radiometric receiver for receiving the noise signals acquired by each of the antennas as a separate channel; and a signal processor for performing a mathematical integration for each separate channel received by the radiometric receiver, for generating from each of the integrated channels a plurality of simultaneous digitally synthesized electromagnetic fields of view, for directing the plurality of electromagnetic fields of view at a plurality of different spatial angles, for performing an autocorrelation operation on each of the integrated channel responses, for computing an inverse Fourier transform on the result of the autocorrelation operation on each of the integrated channel responses; and for generating a spectrograph therefrom presenting power as a function of frequency;

whereby the location and depth of the underground object is determined.

7. A system as set forth in claim 6 wherein the signal processor includes:
    means for performing iterations of the autocorrelation operation on each of the integrated channel responses and for computing an inverse Fourier transform on the result of the autocorrelation operation on each of the integrated channel responses; and
    means for calculating the size of the buried object from the information resulting from the outputs obtained from performing the autocorrelation operation.

8. A system as set forth in claim 6 including:
    a common noise reference for amplitude matching predetermined noise signals with the noise signals acquired by the plurality of antennas; and
    a switch between each antenna and its associated radiometric receiver for alternatively switching between the common noise reference for calibrating and balancing the radiometric receivers.

9. A system as set forth in claim 6 including:
    oscillator means for providing to each separate channel a common local oscillator signal for down conversion; and
    common phase reference means for providing a common phase reference signal for coherent phase detection to each separate channel.

10. A system as set forth in claim 6 including:
    a plurality of individual antennas in a linear array focused at a plurality of different angles in azimuth; and
    a plurality of super-heterodyne radiometer receivers operably associated with each of the individual antennas.

* * * * *